(12) United States Patent
Urard et al.

(10) Patent No.: US 7,551,803 B2
(45) Date of Patent: Jun. 23, 2009

(54) IMAGE ADAPTER WITH TILEWISE IMAGE PROCESSING, AND METHOD USING SUCH AN ADAPTER

(75) Inventors: Pascal Urard, Theys (FR); Laurent Paumier, Grenoble (FR); Yan Meroth, St. Ismier (FR)

(73) Assignee: STMicroelectronics S.A., Montrouge (FR)

( * ) Notice: Subject to any disclaimer, the term of this patent is extended or adjusted under 35 U.S.C. 154(b) by 826 days.

(21) Appl. No.: 10/959,953

(22) Filed: Oct. 6, 2004

(65) Prior Publication Data

US 2005/0111752 A1    May 26, 2005

(30) Foreign Application Priority Data

Oct. 15, 2003   (FR) ................... 03 12034

(51) Int. Cl.
 *G06K 9/32* (2006.01)
(52) U.S. Cl. .................. 382/298; 382/299; 382/300; 348/581; 348/561; 348/556; 348/445
(58) Field of Classification Search ......... 348/561–562, 348/581–582, 556, 445, 441; 345/660–671; 382/293, 298–300
See application file for complete search history.

(56) References Cited

U.S. PATENT DOCUMENTS

| | | | | |
|---|---|---|---|---|
| 6,388,711 B1 * | 5/2002 | Han et al. | ................... | 348/441 |
| 6,411,333 B1 * | 6/2002 | Auld et al. | ................... | 348/441 |
| 6,587,158 B1 * | 7/2003 | Adams et al. | ............... | 348/716 |
| 7,411,628 B2 * | 8/2008 | Tian et al. | ................... | 348/581 |
| 2002/0140853 A1 | 10/2002 | Yang et al. | | |
| 2003/0174148 A1 * | 9/2003 | Chia et al. | .................. | 345/660 |

OTHER PUBLICATIONS

Preliminary French Search Report, FR 0312034, dated Jun. 29, 2004.

* cited by examiner

*Primary Examiner*—Matthew C Bella
*Assistant Examiner*—Sean Motsinger
(74) *Attorney, Agent, or Firm*—Gardere Wynne Sewell LLP (57) ABSTRACT

An image adapter transforms an input image into an output image by successively processing tiles and by changing numbers of columns and of rows of image points. The image adapter includes queue memories connected in series so as to receive values associated with the points of a tile of the input image. A module for calculating a weighted average possesses inputs connected respectively to an output of one of the memories. The module produces values sampled in a direction parallel to the columns and corresponding to the values associated with points of the input image. A sampling rate converter, connected to the output of the module, produces values associated with the points of the output image according to a sampling rate determined for a direction parallel to the rows.

25 Claims, 5 Drawing Sheets

IMAGE ADAPTER WITH TILEWISE IMAGE PROCESSING, AND METHOD USING SUCH AN ADAPTER

PRIORITY CLAIM

The present application claims priority from French Application for Patent No. 03 12034 filed Oct. 15, 2003, the disclosure of which is hereby incorporated by reference.

BACKGROUND OF THE INVENTION

1. Technical Field of the Invention

The present invention relates to an adapter of digital images.

2. Description of Related Art

Digital images are defined by numerical values associated with points distributed according to a matrix of columns and rows. These numerical values define in particular the luminous intensity and/or the color of each image point.

An image adapter is used to transform an input image having determined numbers of columns and rows into an output image having different numbers of columns and/or of rows from those of the input image. It may entail, for example, an image transformation by homothety, which carries out a change of scale between an input image and an output image.

Adapters which transform an input image by row-wise or column-wise processing already exist. They proceed by storing each row or each column. The number of points per row or per column of the images which may thus be transformed is limited by the memory capacity with which the adapter used is equipped. This results in a maximum dimension of the images that can be transformed with the aid of such an adapter, and it is necessary to resort to an adapter which possesses a greater memory capacity in order to transform images which have high numbers of points per row and/or per column.

A need exists in the art for an adapter which does not have any limitation with respect to the number of points per row or per column of the images to be transformed.

SUMMARY OF THE INVENTION

An embodiment of the invention relates to an adapter of images defined by numerical values associated with points distributed as a matrix. The adapter transforms an input image into an output image by successively processing rectangular tiles of like dimensions. The adapter comprises:

first queue memories connected in series and each having a depth equal to the number of points of a tile row. Moreover, these first memories are connected so as to receive values associated with the points of the input image belonging to a tile currently being processed, the values being transmitted in accordance with the successive rows of the tile;

a module for calculating a weighted average having inputs connected respectively to an output of one of the first memories. The module is devised so as to produce, on an output of the module, sequences of values sampled in a direction parallel to the columns and corresponding to the values associated with points of the input image. Each sequence comprises a number of values that is equal to the number of points of a tile row; and a sampling rate converter connected to the output of the module, and devised so as to produce values associated with the points of the output image, according to a sampling rate determined for a direction parallel to the rows.

An advantage of an image adapter according to the invention resides in the fact that it can be used for images of any dimensions, in particular very large ones. Specifically, such an adapter stores the numerical values necessary for the processing of just one tile, whatever the dimensions of the image. A complete image is transformed by partitioning this image into tiles that are processed successively. The transformation of an image having high numbers of columns and/or of rows is obtained by partitioning into a large number of tiles.

Another advantage of an image adapter according to the invention resides in the fact that it is less voluminous, in its embodiment on a silicon substrate, than an adapter not operating by partitioning into tiles. This reduction in size results from the reduced quantity of memories required by virtue of the partitioning into tiles.

According to a preferred embodiment of the invention, the adapter further comprises second queue memories each having a depth equal to the number of points of a tile column. These second memories are connected at input so as to receive, successively for each tile row, values associated with the points of the input image belonging to columns of the tile respectively assigned to each second memory. Each second memory is linked at output to the inputs of the average calculating module and controlled in such a way as to transmit to each input of the module values associated with the points of the input image belonging to a tile processed earlier and situated alongside the tile currently being processed in the direction parallel to the rows. Each second memory is furthermore commanded such that this transmission is performed with a continuous progression between the two tiles for each row of input image common to the two tiles.

By virtue of the use of the second memories, a continuity of traversal of the points of each row of the input image is restored. The output image produced by the adapter is then devoid of discontinuities along its rows, that is to say along the horizontal direction, which would otherwise result from the partitioning into tiles. The output image thus exhibits equivalent quality to that provided by an adapter not operating by partitioning into tiles.

According to an improvement of the invention, the adapter can also comprise a rows and columns selector devised so as to assign determined rows and columns of the input image to each tile, so that when two tiles correspond to adjacent respective segments of like columns of the input image, the selector assigns a determined number of successive rows common to the two tiles to opposite respective edges of each of the two tiles. The adapter furthermore then comprises a tile assembler linked to an output of the converter and adapted for selecting, for the points of the common rows belonging to the two tiles, the values produced by the converter during the processing of that one of the two tiles for which the values are produced last from among the values associated with the points of each tile column.

A continuity of the output image is thus restored between points which belong to like columns and whose associated numerical values result from processing of distinct tiles. The output image does not then exhibit any discontinuity in the vertical direction which would result from the partitioning into tiles.

Advantageously, the weighted average calculating module can be devised in such a way that the sampled values produced by the module are calculated by interpolation, in a direction parallel to the columns, of values associated with points of the input image. The output image then comprises fewer vertical distortions than an image produced by decimation or by repetition of points of the input image.

The sampling rate converter makes it possible, on the basis of the values produced by the average calculating module, to produce values sampled in the direction parallel to the rows with a determined sampling rate. An output image with reduced horizontal distortions may be obtained when this converter is adapted for producing values calculated by interpolation, in the direction parallel to the rows, of the values produced by the average calculating module.

The invention also relates to a method of adapting images using an adapter as described above. In particular, at least one sampling rate conversion factor, in the direction parallel to the rows or the direction parallel to the columns, may be varied during an image adaptation carried out according to this method.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 1b represents an output image corresponding to the input image of FIG. 1a;

DETAILED DESCRIPTION OF THE DRAWINGS

In the FIGURES, identical references correspond to identical elements.

Figure 1A:
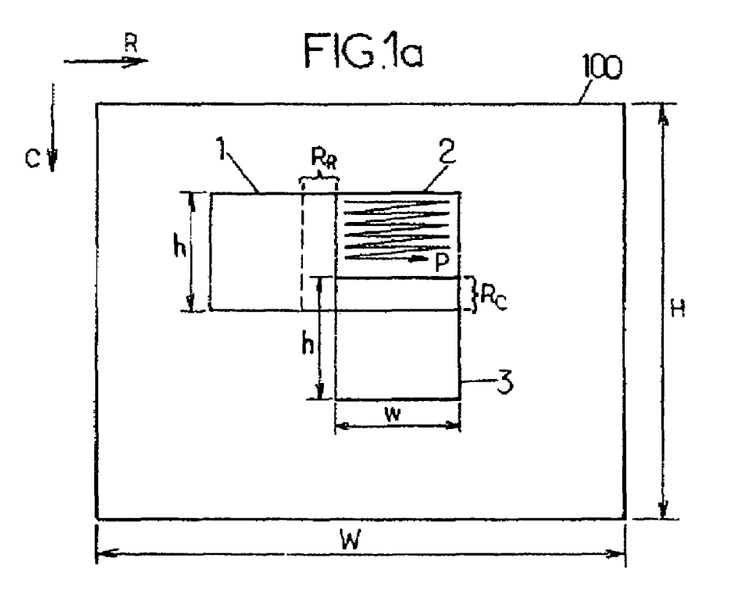
FIG. 1a illustrates a partitioning into tiles of an input image.

According to FIG. 1a, an input image 100 consists of points distributed according to W columns parallel to a direction C oriented downwards in the figure, and referred to as the vertical direction, and according to H rows parallel to a direction R oriented rightwards in the figure, and referred to as the horizontal direction. In what follows, the words "over", "under", "upper", "lower", "left", "right", "first" and "last" are used with reference to these orientations. H and W are two integers. By way of example, for an image 100 of standardized 4/3 format, W may be equal to 640 and H may be equal to 480.

To define the image 100, numerical values are associated with each point which corresponds to the intersection of a row and a column. These numerical values determine the luminosity and/or the color of the point. They may be defined in accordance with one of the standardized color labeling systems, such as the Y, u, v chromatic system, for example, wherein the term Y is the luminosity value, or luminance, and the terms u and v are chrominance values (i.e., they define the color of the relevant point).

Figure 1B:
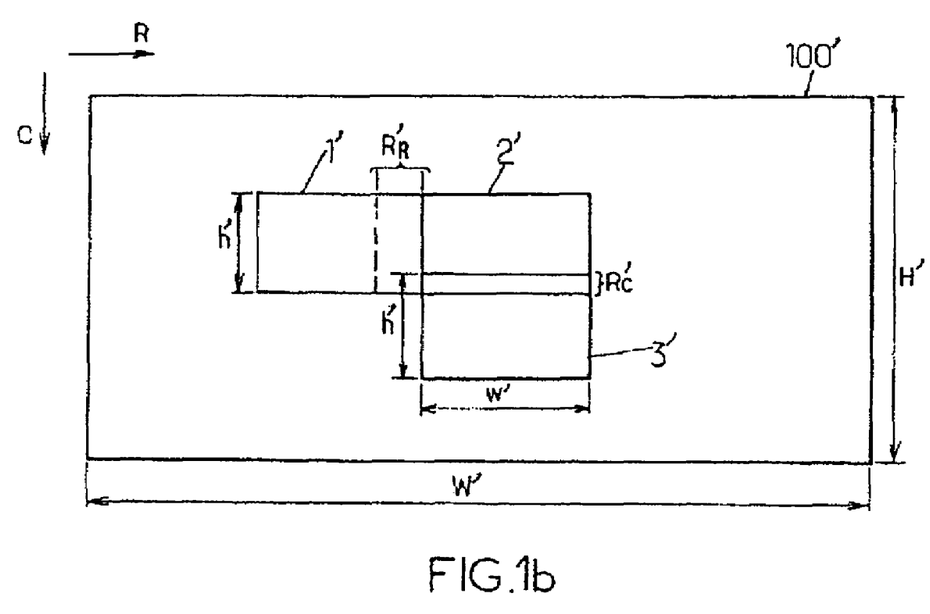

The image 100 is partitioned into rectangular portions (or squares), called input tiles. All the input tiles have identical dimensions: they each possess w tile columns and h points per tile column which form as many tile rows. w and h are two integers. By way of example, the pair (w, h) may equal (19, 16) for luminance values intended to be transformed by an image adapter according to the invention, or may equal (11, 8) for chrominance values intended to be transformed. The union of the input tiles comprises substantially all the points of the image 100. The tiles 1 and 2 represented in FIG. 1 are adjacent in the R direction: the first column of tile 2 immediately follows the last column of tile 1 within the image 100, in the R direction. In the description which follows, the tiles of the image 100 are ordered in the direction R, and then on passing to the next row of tiles in the direction C. Thus, the tile situated at the top left of the image 100 is the first tile, the tile adjacent to the latter in the R direction is the second tile, etc., traversing a first row of tiles until the right edge of the image 100 is reached. A second row of tiles is then traversed, lying beneath the first row of tiles. The tile numbering resumes at the tile of the second row which is situated against the left edge of the image 100. And so on and so forth. Tile 3 represented in FIG. 1b lies beneath tile 2. Tiles 2 and 3 are defined with respect to the rows of the image 100 in such a way as to exhibit an overlap $R_C$ in the direction C. The function of the overlap $R_C$ is explained later. Furthermore, the reference $R_R$ designates a vertical band of the tile 1 which is picked up again during the processing of tile 2, to obtain an overlap between the two tiles in the direction R.

FIG. 1b illustrates an output image format, which may be the standardized 16/9 format, for example. The output image 100' then comprises W' columns of points (for example 1024 columns) and H' rows (for example 576 rows). The luminance and chrominance of each point of the image 100' are defined in the same manner as for the image 100.

The tiles 1', 2' and 3' represented for the output image 100' correspond respectively to the tiles 1, 2 and 3 of the input image 100: they each result from the processing of the corresponding tile of the image 100 by an image adapter according to an embodiment of the invention. Each tile of the image 100', referred to as the output tile, possesses w' columns and h' rows. The numbers w' and h' may be identical or different between two distinct output tiles of one and the same image. For the sake of clarity, in what follows it will firstly be considered that the numbers w' and h' are the same for all the tiles of an output image. FIG. 1b corresponds to such a case. The processing of an input tile converts matrices of w by h values of luminance/chrominance of the image 100 into matrices of w' by h' values of luminance/chrominance corresponding to an output tile. The image 100' is constructed by assembling output tiles 1', 2', 3' . . . according to an arrangement within the image 100' which is identical to that of the corresponding input tiles 1, 2, 3, . . . within the image 100. The overlaps represented: $R'_R$ between tiles 1' and 2', and $R'_C$ between tiles 2' and 3' depend respectively on the overlaps $R_R$ and $R_C$, in particular.

Figure 2:
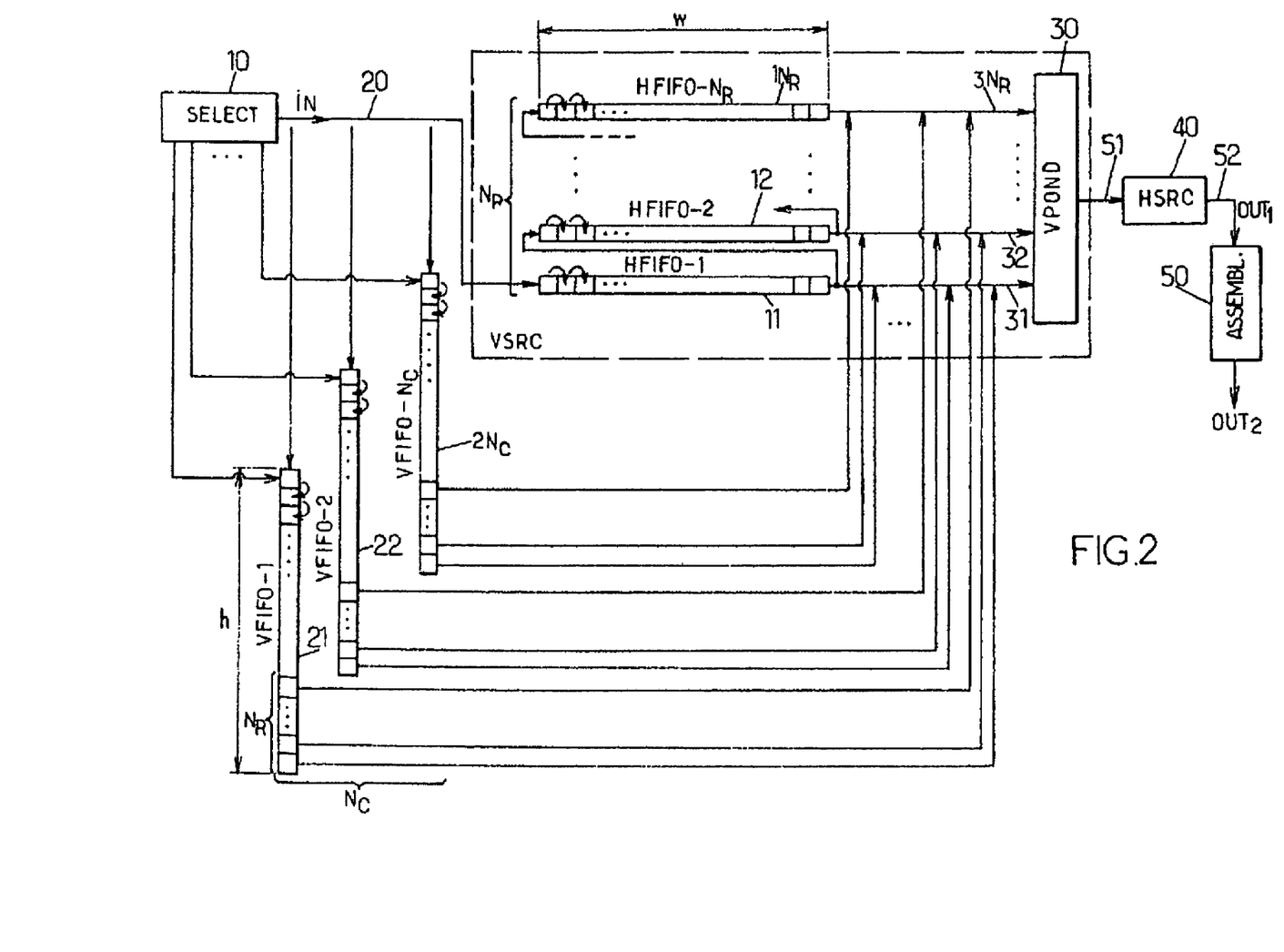
FIG. 2 is a schematic diagram of an image adapter according to the invention.

FIG. 2 represents the architecture of an image adapter capable of performing such tile processing. For the sake of clarity, an adapter which performs a transformation of luminance values only is firstly described.

A selector 10 selects, for each input tile, h successive rows and w successive columns of the image 100. The selector 10 produces the luminance values, denoted IN, of the points of the image 100 corresponding to the intersections of the rows and of the columns selected for a tile currently being processed by the adapter. The values IN are produced by traversing the points of the tile along successive tile rows, from the first row of the tile to the last row of the tile, and from left to right within each tile row. This traversal, referenced P, is represented in FIG. 1a for tile 2.

The values IN are transmitted to $N_R$ FIFO memories connected in series, referenced 11, 12, . . . , $1N_R$ in FIG. 2 and denoted HFIFO-1, HFIFO-2, . . . , HFIFO-$N_R$. Advantageously, $N_R$ is an even number, which may be equal to 4 for example. The values IN are transmitted to the input of the memory 11 by a link 20. The memories 11, 12, ..., $1N_R$ are identical to one another. They each have a depth equal to the length w of an input tile row. At each instant of a timing beat which will be explained subsequently, the respective outputs of the memories 11, 12, ..., $1N_R$ therefore exhibit values IN which belong to one and the same column of the input tile and to successive rows. These values IN correspond to a vertical segment of the input tile. Between two successive instants, this segment is replaced by a segment of the next tile column, according to a slide parallel to the direction R. When the segment corresponding to the values presented by the outputs of the memories 11, 12, ..., $1N_R$ is situated against the right edge of the input tile, the next segment is situated against the left edge of the same tile, with a downward shift of one row. The presentation of the values IN to the outputs of the memories 11, 12, ..., $1N_R$ is thus continued, until the segments reach the end of the last row of the input tile. The method is then continued with the next input tile.

The outputs of the memories 11, 12, ..., $1N_R$ are connected respectively to $N_R$ inputs 31, 32, ..., $3N_R$ of a weighted average calculating module 30. In FIG. 2, the module 30 is denoted VPOND.

Figure 3:
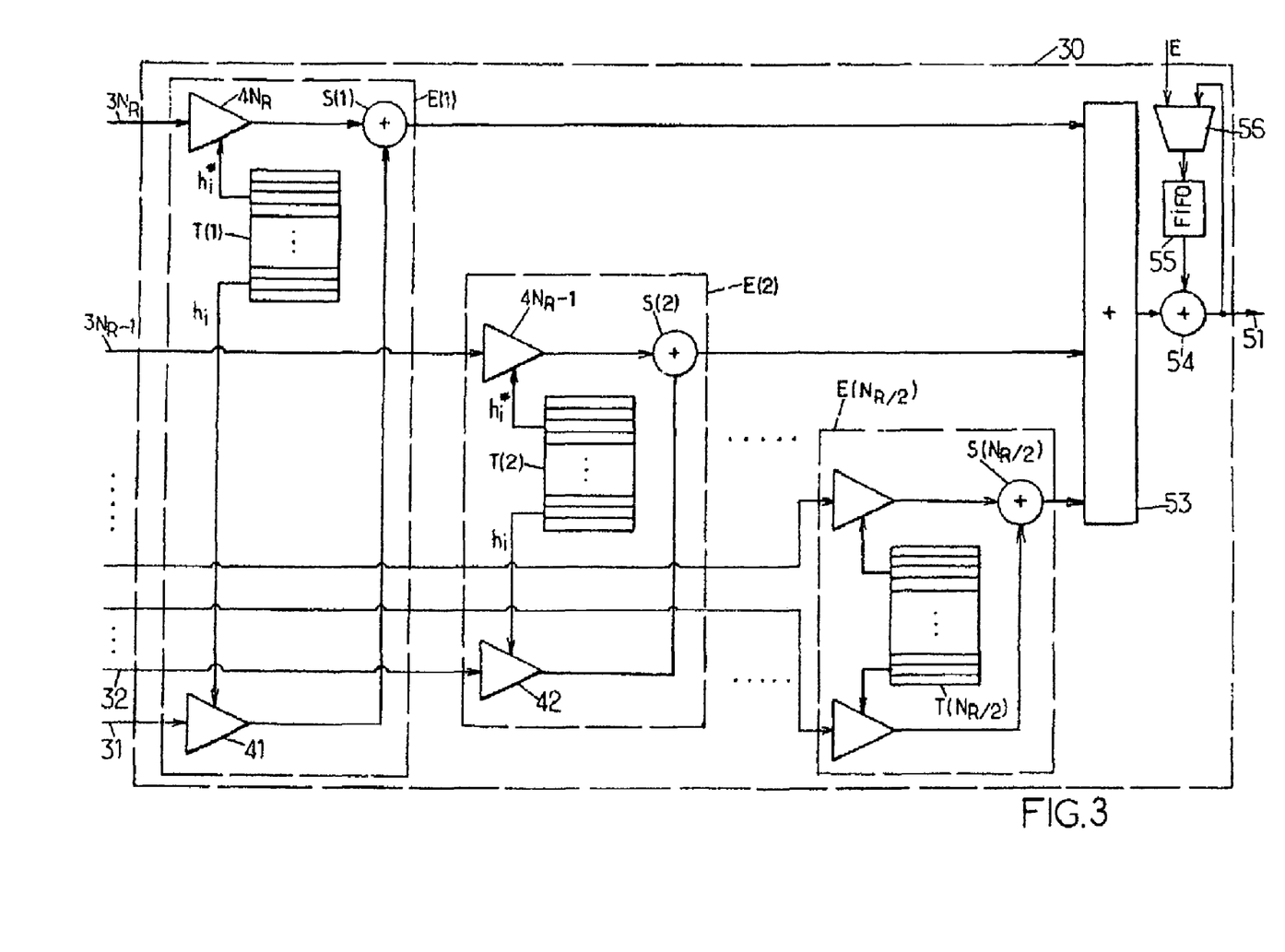
FIG. 3 is a schematic diagram of a weighted average calculating module that can be used in an adapter according to FIG. 2.

According to FIG. 3, the module 30 comprises $N_R/2$ mutually identical cells, referenced E(1), E(2), ..., E($N_R/2$).

The cell E(1) comprises two multipliers 41 and $4N_R$, respective first inputs of which constitute the inputs 31 and $3N_R$ of the module 30. Outputs of the multipliers 41 and $4N_R$ are connected to inputs of an adder S(1). The output of the adder S(1) is connected to a general adder 53 common to all the cells E(1), E(2), ..., E($N_R/2$). Second respective inputs of the multipliers 41 and $4N_R$ are connected to an output of a table T(1) for storing multiplicative coefficients $h_i$ and $h_i^*$. The table T(1) is controlled in such a way that the multiplier 41 receives a value IN on its first input at the same time as it receives a coefficient $h_i$ on its second input. Simultaneously, the multiplier $4N_R$ receives another value IN on its first input and a coefficient $h_i^*$ on its second input.

The cells E(2), ..., E($N_R/2$) each identical to the cell E(1), comprise components such as referenced in FIG. 3. Moreover, the output of the adder 53 is linked to a first input of a secondary adder 54. The output of the secondary adder 54 constitutes the output 51 of the module 30. It is furthermore looped to a first input of a multiplexer 56, and an output queue memory (FIFO), referenced 55, of the module 30 is connected between the output of the multiplexer 56 and a second input of the secondary adder 54. The memory 55 possesses a depth equal to $w+N_C$, $N_C$ being an integer defined subsequently. If $N_C$ is zero, the depth of the memory 55 is equal to w. A value produced on the output 51 is therefore an average of the $N_R$ values IN delivered by the memories 11, 12, ..., $1N_R$ at one and the same instant, weighted by the coefficients $h_i$ and $h_i^*$, and of values contained in the memory 55. The multiplexer 56 furthermore possesses a second input, denoted "E", making it possible to reinitialize the content of the memory 55 with zero values.

The storage tables T(1), T(2), ..., T(NR/2) carry out a permanent recording of the multiplicative coefficients $h_i$ and $h_i^*$. They may each have a relatively small storage capacity, of for example 32 coefficients. They may be ROM type memories. Owing to their small respective capacities, they may alternatively consist of logic gates devised so as to produce the values of the coefficients.

Figure 4:
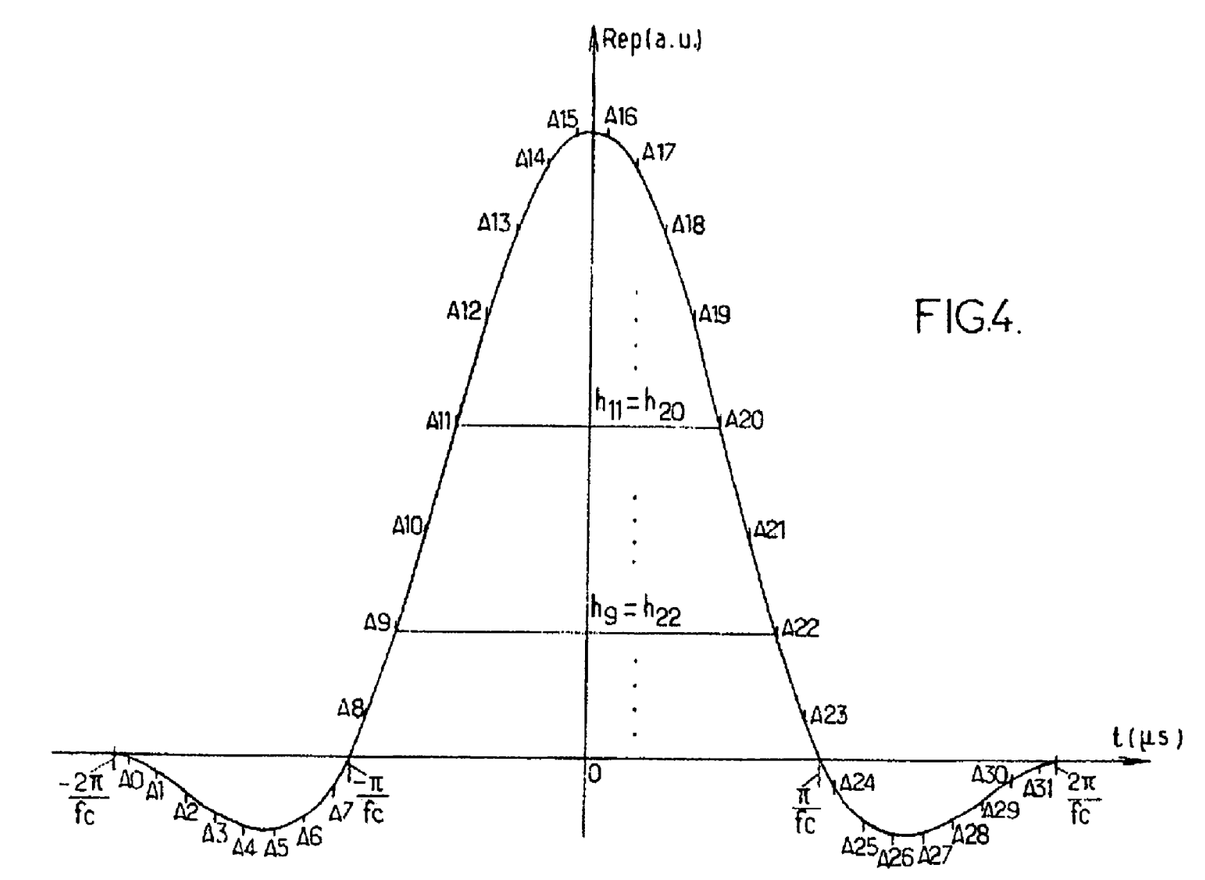
FIG. 4 illustrates a process for determining coefficients that are used in the weighted average calculating module of FIG. 3.

FIG. 4 illustrates a process for determining the coefficients $h_i$ and $h_i^*$ for $N_R$ equal to 4. It represents the characteristic of an impulse response function. The abscissa axis labels a time coordinate t, expressed for example in microseconds (μs). The ordinate axis labels the amplitude Rep of a response to a pulse. It is graduated in arbitrary units (a.u.). The response function may in particular be chosen to perform the strictest possible rejection of the frequencies above the cutoff frequency $f_c$.

Points $A_0, ..., A_{31}$ of the characteristic are selected in a manner suitable for best possible representation of the values of the impulse response. They are regularly distributed over this characteristic, symmetrically with respect to the origin of the time coordinate. The coefficients $h_i$, i being an integer between 0 and 31, correspond to the respective ordinates of the points $A_0, ..., A_{31}$.

The values $h_0, ..., h_7$ are stored in the storage table T(1) of cell E(1), and the values $h_8, ..., h_{15}$ are stored in the storage table T(2) of cell E(2). In the example considered here, the module 30 possesses two cells only. Storage tables T(1) and T(2) each having eight storage locations are used. The coefficients $h_i$ are stored in the tables T(1), T(2) in ascending order of the addresses of each table and in ascending order of the indices of the coefficients. Thus, for table T(1), $h_0$ will be stored at the address 0, $h_1$ at the address 1, ..., $h_6$ at the address 6 and $h_7$ at the address 7. For table T(2), $h_8$ will be stored at the address 0, $h_9$ at the address 1, ..., $h_{14}$ at the address 6 and h15 at the address 7. In general, the address at which the coefficient $h_i$ is stored is advantageously equal to the remainder after dividing the index i of this coefficient $h_i$ by the number of locations of each storage table. Moreover, for a given storage table, if $h_i$ is the coefficient stored at a determined address of this table, $h_i^*$ is the coefficient stored at the address equal to the complement with respect to 7 of the address of the coefficient $h_i$. For example, for table T(1), $h_0^*$ is equal to $h_7$, $h_1^*$ is equal to $h_6$, etc. For table T(2), $h_8^*$ is equal to $h_{15}$, $h_9^*$ is equal to $h_{14}$, etc.

The principle set forth in respect of a converter with two cells ($N_R=4$) whose storage tables have eight locations associated with addresses coded on three bits may be carried over to any number $N_R/2$ of cells, as well as to any capacity of the storage tables. The minimum structure of a module 30 according to the invention corresponds to a single cell: $N_R=2$. In practice, one preferably takes storage tables with 32 locations whose addresses are coded on five bits, thereby making it possible to select a larger number of points on the characteristic of the impulse response function (for example 128 points when the module 30 comprises two cells).

The association described previously of the memories 11, 12, ..., $1N_R$ with the module 30 constitutes a sampling rate converter, denoted VSRC in FIG. 2. The module 30 produces, on the output 51, luminance values interpolated in the direction C which correspond to the luminance values IN of each segment of input tile column that are transmitted by the memories 11, 12, ..., $1N_R$. The interpolated values form a sampling of the variation of the luminance along each segment, according to a sampling rate which is a priori different from that corresponding to the values IN. The converter VSRC thus transforms a segment of $N_R$ points of input tile column into a segment of output tile column having a number of points that is determined as a function of the number of rows H' of the output image 100'. Extended to the scale of the tile, this transformation corresponds to the switchover between the h rows of an input tile and the h' rows of an output tile. The quotient of the number of rows H' of the image 100' over the number of rows H of the image 100 is substantially equal to the vertical sampling rate conversion factor, or vertical conversion factor.

The converter VSRC thus constructed can operate as an oversampler or as an undersampler, depending on whether the vertical conversion factor is greater than or less than unity, respectively.

Operation of the converter VSRC as an undersampler makes it possible to obtain values on the output 51 according to the same frequency as by using an ordinary undersampler for a continuous data stream. The precision of the values produced by the converter VSRC operating as an undersampler is however lower than that obtained with an ordinary undersampler, but it remains greater than that of a filter operating by calculation of averages. Nonzero values stored in the memory 55 of the module 30 come into play when the converter VSRC operates as an undersampler, that is to say when H' is less than H.

Figure 5A:
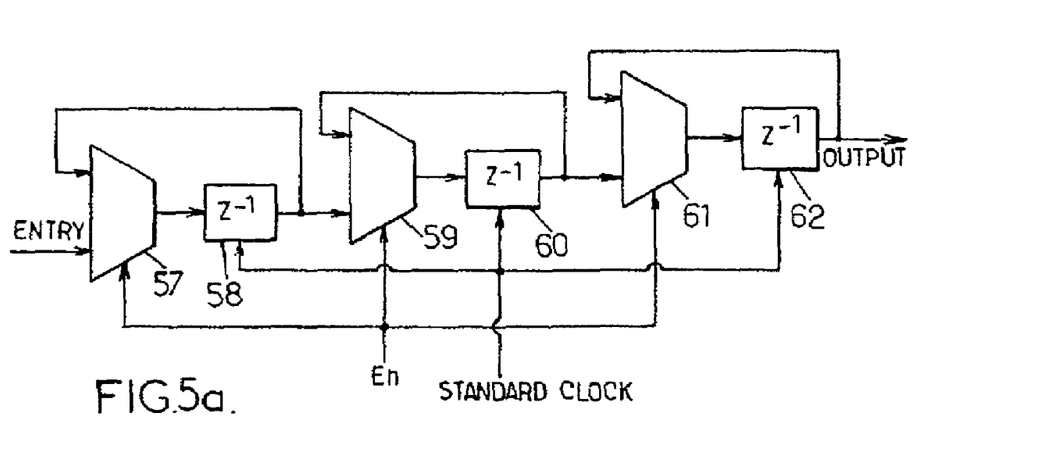
FIGS. 5a and 5b represent two embodiments of memories that can be used in an adapter according to FIG. 2.

To return to FIG. 2, the output 51 of the module 30 is linked to an input of a sampling rate converter 40, or SRC. The converter 40 is denoted HSRC. It may be an oversampler, and in particular an interpolation-based oversampler of the same type as the association, described in detail previously, of the memories $11, 12, \ldots, 1N_R$ and of the module 30. The memories of the converter 40 which correspond to the memories $11, 12, \ldots, 1N_R$ may differ from the latter in number. Furthermore, they each possess a depth equal to the number of numerical values associated with each image point and transformed by the adapter. By way of example, the memories of the converter 40 may store a single numerical value in the case where the image adapter transforms luminance values only, or two numerical values in the case where the image adapter transforms chrominance values. FIG. 5a shows a process for embodying these memories when the image adapter transforms the luminance values and also the chrominance values. They each consist of three flip-flops $Z^{-1}$, referenced 58, 60 and 62, associated respectively with multiplexers 57, 59 and 61. The output of each flip-flop is looped to a first input of the corresponding multiplexer, and the outputs of the flip-flops 58 and 60 are furthermore connected to second inputs of the multiplexers 59 and 61. The second input of the multiplexer 57 receives the numerical values intended to be stored, denoted "entry", and the output of the flip-flop 62 constitutes the output of the values of the equivalent FIFO memory. The output values are denoted "output". The multiplexers 57, 59 and 61 furthermore receive on respective control inputs a signal En which triggers the progression of the "entry" values along the chain of flip-flops 58, 60 and 62. The flip-flops 58, 60 and 62 are each synchronized by a standard clock signal, denoted "standard clock". The flip-flop 62 then produces as "output" value the "entry" value admitted into the flip-flop 58 three cycles earlier of the signal En. In the simplified case for which just one value is associated with each image point, the chain comprises a single flip-flop.

Figure 5B:
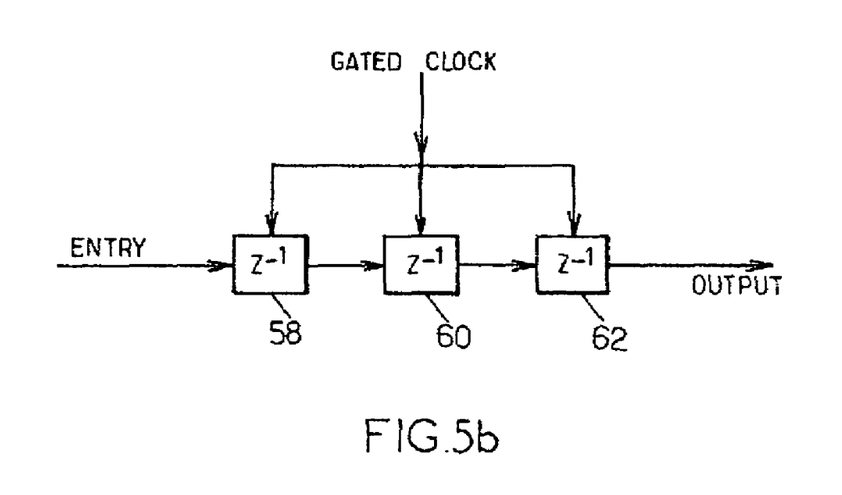

FIG. 5b corresponds to FIG. 5a, for a different system for controlling the flip-flops. In this system, the switching of each flip-flop 58, 60, 62 is triggered by a common control signal consisting of a gated clock. Reduced energy consumption for an identical function for storing values constitutes an advantage of the gated clock signal based control system. The same principle of use of a gated clock signal may be applied to control the admission of a new numerical value into any one of the FIFO memories used in the present invention. For this, the FIFO memory possesses, in addition to its values input linked to the first storage location of this memory, a control input via which it receives a gated clock signal. This signal triggers a progression of the values stored along the chain of storage locations of the memory.

Alternatively, the converter 40 may also be an undersampler, and in particular an interpolation-based undersampler of a type known to the person skilled in the art.

The converter 40 may also consist of an association of an oversampler and an undersampler. In this case, the converter 40 is adapted for operating as an oversampler or as an undersampler as a function of an operating mode selection command. This selection command depends on a comparison between the respective numbers of columns W and W' of the images 100 and 100'.

The operation of the converter 40 is gated by the bit rate of the values produced by the module 30 on the output 51.

The converter 40 receives as input sequences of successive values which correspond to successive rows of the output tile currently being calculated. The sampling rate conversion factor of the converter 40 is substantially equal to the quotient of the number W' of columns of the image 100' over the number W of columns of the image 100. It is called the horizontal conversion factor. The converter 40 then delivers sequences of values which are respectively associated with the points of one and the same row of the output tile.

To determine the first values of an output tile row, an interpolation-based converter 40 needs to have previously received the values produced by the module 30 which correspond to a vertical band of points of the input tile 1, adjacent to the input tile 2 currently being processed, and situated to the left of the latter. The input tile 1 has been processed before the input tile 2, in accordance with the already indicated order of processing of the input tiles.

For this, $N_C$ FIFO memories $21, 22, \ldots, 2N_C$ arranged in parallel are each linked at input to the output of the selector 10, in accordance with FIG. 3. $N_C$ is an integer less than or equal to w, that may for example be equal to 4. The memories $21, 22, \ldots, 2N_C$ are denoted VFIFO 1, VFIFO 2, ..., VFIFO-$N_C$ in FIG. 2. Respective control inputs of the memories $21, 22, \ldots 2N_C$ are linked to outputs of the selector 10 that are dedicated to the transmission of signals for controlling admission of new values IN into each memory $21, 22, \ldots, 2N_C$. These admission control signals may, in particular, be gated clock signals. They are produced by the selector 10 so that, for each row of an input tile currently being processed, the memory $2N_C$ records the numerical value corresponding to the last point of the tile row, the memory $2N_C$-1 records the value corresponding to the penultimate point of the tile row, etc., and the memory 21 records the value corresponding to the w-$N_C^{th}$ point of the same row. Thus, for each tile processed, the values associated with a band of points $R_R$ are recorded in the memories $21, 22, \ldots, 2N_C$. The band $R_R$ possesses the height h of each input tile and corresponds to the last $N_C$ columns of this tile. In FIG. 1, the band $R_R$ is represented for the input tile 1.

The last $N_R$ locations of each memory $21, 22, \ldots, 2N_C$ are respectively connected to the inputs $31, 32, \ldots, 3N_R$ of the module 30. Each memory $21, 22, \ldots, 2N_C$ possesses a depth equal to h. Thus, during the transmission of the values IN associated with the points of the input tile 2, and for each input $31, 32, \ldots, 3N_R$, the values IN of the points of the input tile 1 which are situated in the band $R_R$ are inserted between the end of the transmission of the values associated with the points of a row of tile 2 and the transmission of the values associated with the points of the next row of tile 2. For each row of the tile currently being processed 2, the module 30 is consequently furnished with the values associated with the points of the band $R_R$ of the previous tile 1, belonging to the same input image row. It receives these values in succession according to the continuous order of the points in each input image row, going from tile 1 to tile 2. It is thus possible to determine, with the aid of an interpolation-based converter 40, the first values of an output tile row without discontinuity with respect to the last values of the same output tile row, which are produced during the earlier processing of the adjacent tile situated just to the left of the tile currently being processed.

According to a variant embodiment, the last $N_R$ locations of each memory 21, 22, . . . , $2N_C$ are respectively connected to the inputs of the memories 11, 12, . . . , $1N_C$. The memories 11, 12, . . . , $1N_C$ then each possess a depth equal to $w+N_C$. Under these conditions an identical insertion of the values IN of the input tile 1 between the sequences of the values of each row of the input tile 2 is obtained.

In accordance with the foregoing, the sequences of successive values that the converter 40 receives as input, corresponding to successive rows of the input tile currently being calculated, each possess $w+N_C$ values. $N_C$ is equal to the number of columns of the overlap $R_R$. The converter 40 produces on the output 52, for each output tile, values OUT1 associated with the points of the output image. These values OUT1 are produced by successive sequences which correspond respectively to the rows of the output tile. A potential overlap of the output tiles is thus obtained, corresponding to the band $R'_R$ in FIG. 1b between the output tiles 1' and 2', which procures the output image continuity in the direction R of the rows.

The image 100' is constructed from the values OUT1 with the aid of an output tiles assembler 50 connected to the output 52. The assembler 50 is linked by connections (not represented) to the selector 10, to the module 30 and to the converter 40, in such a way as to receive various sequencing signals for the values OUT1. In particular, these sequencing signals comprise:

first signals for identifying the values OUT1 which correspond to the first points of the successive rows of the output tiles;

second signals for identifying the rows within an output tile, and third signals for labeling the position of each output tile 1', 2', 3' in the output image 100'.

The selector 10 is adapted to assign rows of the input image 100 to adjacent tiles superimposed in the direction C so that the latter exhibit an overlap $R_C$. FIG. 1 represents such an overlap $R_C$ between tiles 2 and 3. The overlap $R_C$ is obtained by assigning like successive rows of the image 100 for the last $N_R$ rows of the upper input tile (tile 2 in FIG. 1) and for the first $N_R$ rows of the lower tile (tile 3). The overlap $R_C$ extends over the entire width of the two tiles in the direction R. The output tiles 2' and 3' (FIG. 1b) resulting respectively from the processing of the input tiles 2 and 3 potentially form the overlap $R'_C$ within the image 100'.

The assembler 50 is adapted for producing values OUT2 selected from among the values OUT1 in the following manner. For values OUT1 associated with output tile points situated outside an overlap $R'_C$, the value OUT2 is identical to the value OUT1. For values OUT1 associated with output tile points situated inside an overlap $R'_C$, the value OUT2 is equal to the value OUT1 produced at the time of the upper tile (tile 2' for the overlap between tiles 2' and 3'). In both cases, that point of the image 100' with which the value transmitted by the assembler 50 is associated is unchanged. The selection of the values produced during the processing of the upper tile results from the order adopted for the processing of the successive rows of each tile: from the upper rows to the lower rows.

The overlaps $R_C$ of the adjacent input tiles in the direction C make it possible to obtain continuity of the numerical values OUT2, according to the columns common to these tiles, going from one output tile to another. Specifically, the values OUT1 associated with points of the overlap $R'_C$ and obtained during the processing of tile 3 are calculated although the module 30 is not furnished with the values IN associated with the upper points in the direction C and belonging to the same columns. Therefore, these values do not correspond to correct interpolations in the direction C. The values OUT1 associated with points of the overlap $R'_C$ and obtained during the processing of tile 2 do not exhibit this artifact caused by the partitioning into tiles.

The potential overlaps $R'_R$ between adjacent output tiles in the direction R may be processed in the same way by the assembler 50.

The above description is now carried over to an adapter according to the invention capable of transforming images defined by several numerical values. By way of example, consideration is given to an adapter intended for images defined by three numerical values for each point: one luminance value and two chrominance values.

The selector 10 is adapted for producing a stream of values IN which comprises the numerical values which are associated with each point of the input image and which are transmitted in succession before the values associated with the next point in the order of traversal P of the input image. By way of examples, for a Y:u:v input image format corresponding to 4:4:4, according to the standard image format notation known to the person skilled in the art, there is just one numerical value per input image point for a luminance only adapter, and two numerical values per input image point for a chrominance only adapter. The memories 11, 12, . . . , $1N_C$ and 21, 22, . . . , $2N_R$ each have a depth adapted with respect to the number of numerical values per point of the input image. Likewise, the converter 40 is adapted for receiving as input 51 in succession values associated with one and the same point, then the values associated with a next point. It can be equipped with memories in accordance with FIG. 5a or with FIG. 5b. The converter 40 then produces in succession, on its output 52, the values associated with one and the same point of the output image, then the values associated with a next point of the output image.

Indications are now given concerning various modes of adjusting edges of tiles with respect to the edges of an image. The partitioning into tiles of the image 100 is commenced, for example, at the first top left point of the image. Given that the input tiles have fixed dimensions, the partitioning of the image 100 into tiles may not coincide with the right and/or lower edges of the image 100, as a function of the latter's dimensions. Depending on the number of columns and/or rows which constitute the mismatch between the partitioning into tiles and the edges of the image 100, three modes of adjustment may be used. Optionally, the partitioning into tiles is re-centered with respect to the image 100 so as to redistribute the adjustment between opposite edges of the image 100.

A first mode of adjustment, designated PADD mode, is suitable when the partitioning of the image 100 into input tiles is larger than the image 100, in the direction R or the direction C. In this case, certain of the input tiles neighboring edges of the image 100 are completed by repeating the tile columns and/or rows that neighbor the relevant edge of the image 100, until image periphery tiles corresponding to the format w by h are obtained.

A second mode of adjustment, designated CROP, can be used when the partitioning of the image 100 into input tiles is smaller than the image 100. According to this mode, columns and/or rows of the image 100 neighboring edges of the image are abandoned for the transformation of the image. This mode may be used especially to adjust the component of the output image corresponding to the chrominance values with respect to the component of the output image corresponding to the luminance values.

Finally, a third mode of adjustment, designated CLIP, concerns an adjustment of the output image with respect to the assemblage of output tiles. In particular, when an adjustment according to PADD mode has been performed at the level of the input image, the CLIP mode makes provision to delete image columns and/or rows neighboring the periphery of the image 100', which correspond to completed columns and/or rows.

Numerous variants of the image adapter described hereinabove, as well as its manner of operation, may be implemented. All these variants, which also have the characteristics claimed, are included within the invention.

Among these variants, mention may be made of systems that use orders of traversal of the points of each tile and/or orders of traversal of the tiles in the input image which are different from those used hereinabove. Adapter operations that are equivalent are then obtained.

Mention may also be made of systems for which the principles of obtaining continuity of the numerical values on switching between two adjacent tiles are exchanged between the horizontal and vertical directions.

Among the applications of an image adapter according to the invention, mention may be made of a system based on one or more image adapters which receives as input an image with the Y:u:v format corresponding to 4:2:0. According to this format, a luminance value is associated with each point of the input image, while a single chrominance value u and a single chrominance value v are associated with a quadruplet of adjacent points of the input image.

The system makes it possible, in a single operation, to change both the scale of the image, by homothetic transformations in one or both directions, horizontal and vertical, and its u:v chrominance format. Simultaneously making changes of scale and of chrominance format leads to a higher output image quality than that obtained by performing the same changes through successive operations.

According to a possible embodiment, such a system can comprise two image adapters associated in parallel. The first adapter transforms the luminance values, and the second adapter transforms the chrominance values. The two adapters simultaneously process one and the same tile of the input image. By using appropriate monitoring processes (sequencing signals, modes of adjustment, etc.), the adapter which transforms the luminance values can drive the adapter which transforms the chrominance values at the level of the edges of each tile. Thus, the outputs of the two adapters may be synchronized. Intermediate storage of the image is then eliminated, thereby reducing the quantity of memories necessary for carrying out the image transformation.

An image adapter according to the invention is also particularly appropriate for obtaining particular video effects. By way of example, mention may be made of anamorphosis, which consists of a differential magnifying effect on the output image 100' between its center and its edges. Such an effect can be used in the horizontal direction R of the image, or in the vertical direction C, or in both directions. To do this, the horizontal and/or vertical conversion factors must be modified dynamically, that is to say during the transformation of an image, thereby having an effect on the image undergoing transformation. They may in particular be modified between the processing of two adjacent tiles. A more continuous magnifying effect is obtained when the conversion factor or factors are modified during the processing of each tile. The differential magnifying effect is positive when the conversion factor applied is smaller at the image periphery as compared with its value at the center of the image. During a continuous succession of output images, an object which crosses the image between two of the latter's opposite edges seems to get closer to and then further away from the viewer. Conversely, a negative differential magnifying effect is obtained when the conversion factor or factors have higher values at the image periphery: an object crossing seems to get further away from and then closer to the viewer.

Finally, an image adapter according to the invention is compatible with input or output images intended for various types of terminals for editing. In particular, these may be images for cathode ray screens, whose display points, or pixels, are oblong. They may also be images for liquid crystal screens, which possess square or polygonal pixels. The adapter may also be used to transform images before they are printed. It then allows adaptation images as a function of determined printing dimensions and of specific resolution parameters for a given printer.

It is pointed out that the following improvements to an image adapter according to the invention have been illustrated by the detailed description given hereinabove:

the average calculating module comprises multipliers having respective inputs each connected to the output of one of the first memories, respective outputs of the multipliers being linked to inputs of an adder, an output of the adder being linked to the output of the module;

the average calculating module furthermore comprises a secondary adder and an output queue memory of the module having a depth at least equal to the number of points of a tile row, the output of the adder being linked to a first input of the secondary adder and an output of the secondary adder being linked to the output of the module, a supplementary link linking the output of the secondary adder to a second input of the secondary adder, the supplmentary link comprising the output queue memory of the module;

the depth of the output queue memory of the average calculating module is at least equal to the sum of the number of points of a tile row and of the number of second memories;

the converter is adapted for producing values calculated by interpolation in the direction parallel to the rows of values produced by the average calculating module;

the memories and the converter are adapted in such a way that the adapter processes images defined by several numerical values associated with each image point, by receiving as input successively the values associated with one and the same point of the input image, then the values associated with a next point of the input image, and by producing as outputs successively the values associated with one and the same point of the output image, then the values associated with a next point of the output image;

certain at least of the flip-flops which the adapter comprises are associated with respective multiplexers receiving on respective control inputs of the multiplexers a triggering signal; and certain at least of the queue memories or of the flip-flops which the adapter comprises are provided with respective activation command inputs for receiving gated clock signals.

Furthermore, the method of adapting images according to the invention may profit from the following improvements:

the conversion factor is modified during the processing of a tile;

the module is commanded to produce oversampled or undersampled values in the direction parallel to the columns;

a change of scale and a change of chrominance format are simultaneously performed between the input image and the output image; and a first image adapter transforms luminance values associated with the points of the input image, and a second image adapter transforms chrominance values associated with quadruplets of adjacent points of the input image, the first and second adapters simultaneously processing one and the same tile.

Accordingly, this invention is not to be considered limited to the specific examples chosen for purposes of disclosure, but rather to cover all changes and modifications, which do not constitute departures from the permissible scope of the present invention. The invention is therefore not limited by the description contained herein or by the drawings, but only by the claims.

What is claimed is:

1. An adapter of an image defined by numerical values associated with points distributed as a matrix, which adapter is intended for transforming an input image into an output image by successively processing rectangular tiles of like dimensions, the image adapter comprising:

a plurality of first queue memories connected in series and each having a depth equal to a number of points of a tile row, and connected so as to receive values associated with the points of the input image belonging to a tile currently being processed, the values being transmitted in accordance with the successive rows of the tile;

a module for calculating a weighted average having inputs connected respectively to an output of each one of the first memories, and devised so as to produce, on an output of the module, sequences of values sampled in a direction parallel to tile columns and corresponding to the values associated with successive points of the input image, each sequence comprising a number of values that is equal to the number of points of the tile row;

a sampling rate converter connected to the output of the module, and devised so as to produce values associated with the points of the output image, according to a sampling rate determined for a direction parallel to the tile rows; and a plurality of second queue memories each having a depth equal to the number of points of a tile column, and connected at their inputs so as to receive, successively for each tile row, values associated with the points of the input image belonging to tile columns;

each second memory being linked at its output to the inputs of the average calculating module and controlled in such a way as to transmit to each input of the average calculating module values associated with the points of the input image belonging to a tile processed earlier and situated alongside the tile currently being processed in the direction parallel to the rows, with a continuous progression between the current and earlier tiles for each row of input image common to the current and earlier tiles.

2. The image adapter according to claim 1, further comprising a rows and columns selector assigning determined rows and columns of the input image to each tile, so that when two tiles correspond to adjacent respective segments of like columns of the input image, the selector assigns a determined number of successive rows common to the two tiles to opposite respective edges of each of the two tiles, and a tile assembler linked to an output of the converter for selecting, for the points of the common rows belonging to the two tiles, the values produced by the converter during the processing of that one of the two tiles for which the values are produced last from among the values associated with the points of each tile column.

3. The adapter according to claim 1, wherein the weighted average calculating module calculates the sampled values produced by the module by interpolation, in a direction parallel to the columns, of values associated with points of the input image.

4. The adapter according to claim 1, wherein the weighted average calculating module comprises multipliers having respective inputs each connected to the output of one of the first memories, respective outputs of the multipliers being linked to inputs of an adder, an output of the adder being linked to the output of the module.

5. The adapter according to claim 4, wherein the weighted average calculating module further comprises a secondary adder and an output queue memory of the module having a depth at least equal to the number of points of a tile row, the output of the adder being linked to a first input of the secondary adder and an output of the secondary adder being linked to the output of the module, a supplementary link linking the output of the secondary adder to a second input of the secondary adder, the supplementary link comprising the output queue memory of the module.

6. The adapter according to claim 5, wherein the depth of the output queue memory of the average calculating module is at least equal to the sum of the number of points of a tile row and of the number of second memories.

7. The adapter according to claim 1, wherein the converter produces values calculated by interpolation in the direction parallel to the rows of values produced by the average calculating module.

8. The adapter according to claim 7, wherein the converter operates as an oversampler or as an undersampler as a function of a command transmitted to the converter.

9. The adapter according to claim 1, wherein the memories and the converter are adapted in such a way that the adapter processes images defined by several numerical values associated with each image point, by receiving as input successively the values associated with one and the same point of the input image, then the values associated with a next point of the input image, and by producing as output successively the values associated with one and the same point of the output image, then the values associated with a next point of the output image.

10. The adapter according claim 1, in which certain at least of the flip-flops which the adapter comprises are associated with respective multiplexers receiving on respective control inputs of the multiplexers a triggering signal.

11. The adapter according to claim 1, in which certain at least of the queue memories or of flip-flops which the adapter comprises are provided with respective activation command inputs for receiving gated clock signals.

12. An adapter of an image defined by numerical values associated with points distributed as a matrix, which adapter is intended for transforming an input image into an output image by successively processing rectangular tiles of like dimensions, the image adapter comprising:

a plurality of row memories connected in series and each having a depth equal to a number of points of a tile row for storing values associated with the points of the input image belonging to a tile currently being processed;

a plurality of column memories each having a depth equal to the number of points of a tile column for storing values associated with the points of the input image belonging to a tile previous to the tile currently being processed;

a module for calculating a weighted average having inputs connected respectively to receive values that were stored in the row and column memories for generating, at an output, first sequences of values which correspond to values from the column memories corresponding to a portion of the previous tile and second sequences of values which correspond to values from the row memories corresponding to the tile currently being processed, wherein the portion of the previous tile is situated in the input image alongside the tile currently being processed; and a sampling rate converter connected to receive the first and second sequences of values output from the module and generate therefrom values associated with the points of the output image, according to a sampling rate determined for a direction parallel to the tile rows;

wherein values for each row of the previous tile portion stored in the column memories are transmitted to the module input before values for each corresponding row of the tile currently being processed and stored in the row memories.

13. The adapter according to claim 12, wherein the values are values of luminance or of chrominance.

14. The adapter according to claim 12, further comprising means for modifying at least one sampling rate conversion factor, in a direction parallel to rows or a direction parallel to columns, during image adaptation.

15. The adapter according to claim 14, wherein the conversion factor is modified during the processing of a tile.

16. The adapter according to claim 12, wherein the module for calculating produces one of oversampled or undersampled values in a direction parallel to the columns.

17. The adapter according to claim 12, wherein the module for calculating simultaneously performs a change of scale and a change of chrominance format between the input image and the output image.

18. The adapter according to claim 17, wherein the module for calculating further performs one of a first image adaptation to transform luminance values associated with the points of the input image, and a second image adaptation to transform chrominance values associated with quadruplets of adjacent points of the input image.

19. The adapter according to claim 18, wherein the first image adaptation drives the second image adaptation at a level of edges of the tiles.

20. The adapter according to claim 12, wherein the output image is addressed to a screen whose display points are oblong or polygonal.

21. The adapter according to claim 12 wherein the input image has a first column/row number ratio and the output image has a second column/row number ratio, and wherein each tile is a w by h matrix of image values, the sampling rate converter performing a sampling rate conversion of the w by h matrix for each input tile into a w' by h' matrix of image values so as to form a plurality of output tiles, where w≠w' and h≠h' and assembling the plurality of output tiles in an order corresponding to an order of the input tiles in the input image so to form the output image.

22. The adapter according to claim 21 wherein the tiles at least slightly overlap each other with respect to both rows and columns of the input image.

23. The adapter according to claim 21 wherein the sampling rate conversion transforms a first number of image values, the first number being associated with the first ratio, into a second number of image values, the second number being associated with the second ratio.

24. The adapter according to claim 12 wherein the output image is a homothetic transformation of the input image.

25. The adapter according to claim 12 wherein the output image is an anamorphosis transformation of the input image.

* * * * *

UNITED STATES PATENT AND TRADEMARK OFFICE
CERTIFICATE OF CORRECTION

| | | |
|---|---|---|
| PATENT NO. | : 7,551,803 B2 | |
| APPLICATION NO. | : 10/959953 | |
| DATED | : June 23, 2009 | |
| INVENTOR(S) | : Pascal Urard et al. | |

It is certified that error appears in the above-identified patent and that said Letters Patent is hereby corrected as shown below:

In the Claims:

At column 15, claim number 12, line number 4, please delete the word "colunm" and replace with the word --column--.

Signed and Sealed this
Fourteenth Day of June, 2011

David J. Kappos
*Director of the United States Patent and Trademark Office*